(12) United States Patent
Li et al.

(10) Patent No.: US 9,411,829 B2
(45) Date of Patent: Aug. 9, 2016

(54) IMAGE-BASED FACETED SYSTEM AND METHOD

(71) Applicant: YAHOO! INC., Sunnyvale, CA (US)

(72) Inventors: Jia Li, Santa Clara, CA (US); Nadav Golbandi, Haifa (IL); XianXing Zhang, Durham, NC (US)

(73) Assignee: Yahoo! Inc., Sunnyvale, CA (US)

( * ) Notice: Subject to any disclaimer, the term of this patent is extended or adjusted under 35 U.S.C. 154(b) by 474 days.

(21) Appl. No.: 13/913,943

(22) Filed: Jun. 10, 2013

(65) Prior Publication Data

US 2014/0363075 A1 Dec. 11, 2014

(51) Int. Cl.
*G06F 17/30* (2006.01)

(52) U.S. Cl.
CPC .............................. *G06F 17/30274* (2013.01)

(58) Field of Classification Search
CPC ............... G06F 17/30274; G06F 17/30247; G06F 17/30265; G06F 17/30268; G06F 17/30256; G06F 17/3028; G06F 17/30867; G06F 17/30244; G06F 17/30277; G06F 17/30598; G06F 17/30271; G06F 17/30554; G06F 17/30705; G06F 17/30023; G06K 9/6267; G06K 9/00456; G06K 9/4676; G06K 9/72; G06K 9/00288
See application file for complete search history.

(56) References Cited

U.S. PATENT DOCUMENTS

| | | | |
|---|---|---|---|
| 2007/0005356 A1* | 1/2007 | Perronnin | G06K 9/4676 704/245 |
| 2015/0170333 A1* | 6/2015 | Jing | G06F 17/30277 345/660 |

OTHER PUBLICATIONS

Fan et al, "A Novel Approach to Enable Semantic and Visual Image Summarization for Exploratory Image Search", Oct. 2008, ACM, pp. 358-365.*
White et al, "Web-Scale Computer Vision using MapReduce for Multimedia Data Mining", Jul. 2010, ACM, pp. 1-10.*

* cited by examiner

*Primary Examiner* — Edward Park
(74) *Attorney, Agent, or Firm* — James J. DeCarlo; Greenberg Traurig, LLP

(57) ABSTRACT

Disclosed herein is a system and method that facilitate searching and/or browsing of images by clustering, or grouping, the images into a set of image clusters using facets, such as without limitation visual properties or visual characteristics, of the images, and representing each image cluster by a representative image selected for the image cluster. A map-reduce based probabilistic topic model may be used to identify one or more images belonging to each image cluster and update model parameters.

21 Claims, 6 Drawing Sheets

IMAGE-BASED FACETED SYSTEM AND METHOD

FIELD OF THE DISCLOSURE

The present disclosure relates to using facets, or image features, to describe clusters or groups of visually similar images, and further relates to large-scale processing of images to identify the images' cluster membership.

BACKGROUND

The number of digital images available to a computer user is steadily increasing. While the increased availability provides the user with access to more images, the sheer volume of images makes it difficult for the user to locate a desired image. Search and/or browsing tools have been used to filter images based on query terms; however, these traditional image search/browsing tools are lacking as they present the user with a large number of images without any structure or organization. For example, a text-based search tool that uses a textual query, returns all of the images that are relevant to the textual query. To further illustrate, a textual query "San Francisco" yields a result set with a number of images that is not trivial for the user to browse. The user is forced to sift through hundreds, thousands, etc. of images provided in response to query terms by traditional search/browsing tools to find an image, or images, of interest to the user, which is frustrating and time consuming for the user.

SUMMARY

The present disclosure seeks to address failings in the art and to facilitate searching and/or browsing of images by clustering, or grouping, the images using a set of image clusters using facets, such as without limitation visual features, properties and/or characteristics, of the images, and representing each image cluster by one or more representative images selected for each image cluster. Embodiments of the present disclosure may use a map-reduce based probabilistic model to generate and update the probabilistic model used to identify the one or more images belonging to each image cluster.

Embodiments of the present disclosure enable a faceted search over a collection of images, the facets being used to describe clusters or groups of visually similar images. The user is able to select one or more clusters of interest, and disregard clusters of images that are not of interest to the user. The user can enjoy the time spent on images of interest, e.g., such as browsing, commenting, etc. In accordance with one or more such embodiments, an image clustering algorithm is used to assign each image in a set of images to an image cluster from a set of image clusters based on image features determined for each image cluster using the image set, and one or more images can be selected as a representative image of the image cluster and the images belonging to the image cluster. Embodiments of the present disclosure provide the user with a faceted exploration of the images by allowing the user to in effect select the facets and facet values by selecting the image representative of the facets of images belonging to the image cluster represented by the representative image; the user need not even be aware of specific facets and/or facet values. The user may use a "drill down" approach to browse/select an image, or images, by selecting, e.g., clicking on, a representative image for an image cluster, and viewing the images belonging to the selected image cluster. Conversely, the user can disregard images that are of little or no interest to the user using the "drill down" approach.

In accordance with one or more embodiments, a method is provided, the method, comprising representing, by at least one computing device, each of a plurality of images as a plurality of quantized gradient-related feature vectors; generating, by the at least one computing device, a probabilistic topic model comprising image-specific parameters for each image in the plurality of images and cluster-specific parameters for each of a plurality of clusters, the image-specific parameters and cluster-specific parameters being learned in parallel using a map-reduce architecture; assigning, by the at least one computing device, each image from the plurality of images to a cluster from the plurality of clusters using the image's image-specific parameters; and identifying, by the at least one computing device and for each cluster from the plurality of clusters, at least one image assigned to the cluster as a representative image for the cluster.

In accordance with one or more embodiments a system is provided, which system comprises at least one computing device comprising one or more processors to execute and memory to store instructions to represent each of a plurality of images as a plurality of quantized gradient-related feature vectors; generate a probabilistic topic model comprising image-specific parameters for each image in the plurality of images and cluster-specific parameters for each of a plurality, of clusters, the image-specific parameters and cluster-specific parameters being learned in parallel using a map-reduce architecture; assign each image from the plurality of images to a cluster from the plurality of clusters using the image's image-specific parameters; and identify, for each cluster from the plurality of clusters, at least one image assigned to the cluster as a representative image for the cluster.

In accordance with yet another aspect of the disclosure, a computer readable non-transitory storage medium is provided, the medium for tangibly storing thereon computer readable instructions that when executed cause at least one processor to represent each of a plurality of images as a plurality of quantized gradient-related feature vectors; generate a probabilistic topic model comprising image-specific parameters for each image in the plurality of images and cluster-specific parameters for each of a plurality of clusters, the image-specific parameters and cluster-specific parameters being learned in parallel using a map-reduce architecture; assign each image from the plurality of images to a cluster from the plurality of clusters using the image's image-specific parameters; and identify, for each cluster from the plurality of clusters, at least one image assigned to the cluster as a representative image for the cluster.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an example of a set of images in accordance with one or more embodiments of the present disclosure.

FIG. 2 provides an example of a process flow in accordance with one or more embodiments.

FIG. 3 provides an example of image processing in accordance with FIG. 2 and one or more embodiments of the present disclosure.

FIG. 4 provides an overview of a framework for image storage and image clustering using a learned model in accordance with one or more embodiments of the present disclosure.

DETAILED DESCRIPTION

Figure 1:
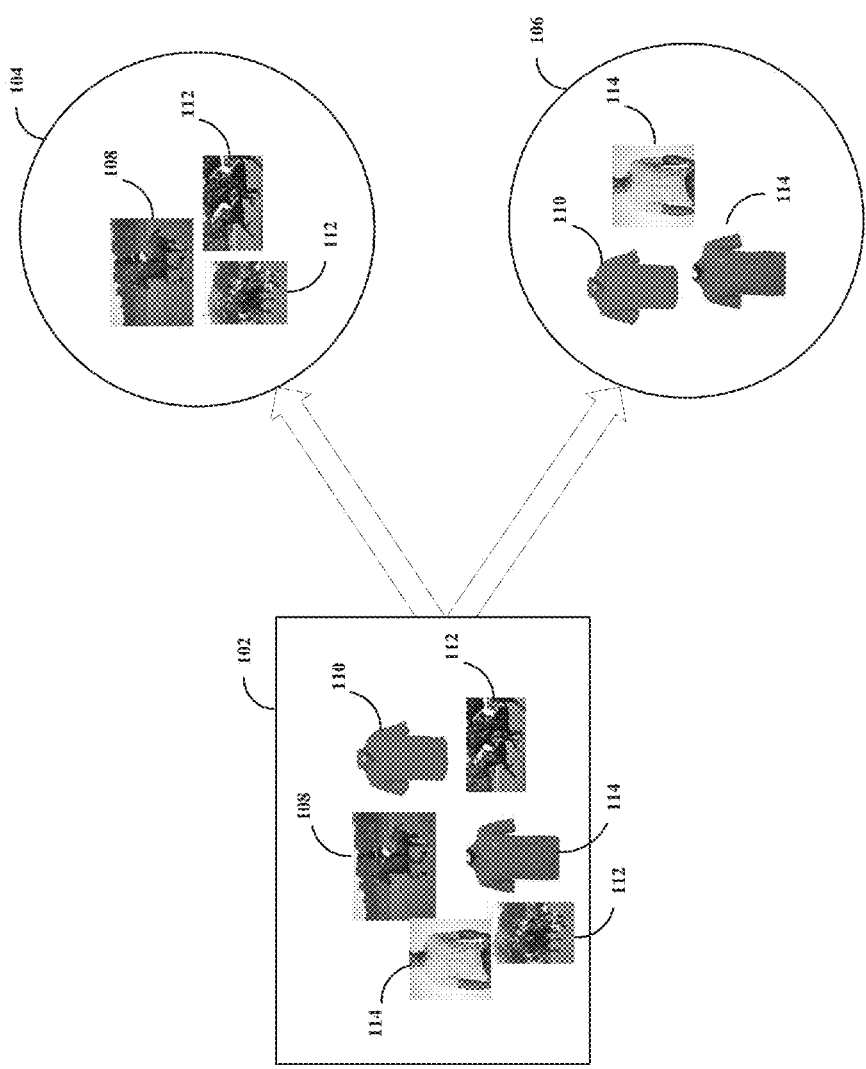

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Certain embodiments of the present disclosure will now be discussed with reference to the aforementioned figures, wherein like reference numerals refer to like components. The detailed description provided herein is not intended as an extensive or detailed discussion of known concepts, and as such, details that are known generally to those of ordinary skill in the relevant art may have been omitted or may be handled in summary fashion.

In general, the present disclosure includes a system, method and architecture that facilitate searching and/or browsing of images by clustering, or grouping, the images into a set of clusters using facets, such as without limitation visual properties or visual characteristics, and representing each cluster using a representative image selected for the cluster. Embodiments of the present disclosure may use a map-reduce based probabilistic topic model to identify the one or more images belonging to each image cluster and to generate and update the model.

FIG. 1 provides an example of a set of images in accordance with one or more embodiments of the present disclosure. In this non-limiting example, image set 102 comprises images 108, 110, 112 and 114. In the example shown, all of the images in set 102 relate to the word "polo." As can be seen from the example, some of the images depict a polo event, e.g., images 108 and 112, and some of the images depict a polo shirt, e.g., images 110 and 114. All of the images in set 102 might be returned in response to a query using the term "polo."

Embodiments of the present disclosure assign each of the images in set 102, including images 108, 110, 112 and 114, to an image cluster, e.g., image cluster 104 or image cluster 106, using facets of the images. In accordance with one or more embodiments, the facets correspond to gradient-related features determined for each image, which features are used to build a "vocabulary," which is used with a probabilistic topic model to assign each image to an image cluster.

Embodiments of the present disclosure may use a map-reduce architecture to associate an image with an image cluster and to update the probabilistic topic model. At least one embodiment of the present disclosure learns image-specific parameters, $\Theta_i$, for $0<i<I$, using mappers and image-cluster-specific parameters, $\Phi_c$, for $0<c<C$, using reducers, the mappers and reducers operating in parallel.

In the example, shown in FIG. 1, images 108 and 112 are assigned to a "polo event" image cluster 104 and images 110 and 114 are assigned to a "polo shirt" image cluster 106 using gradient features of each of the images in set 102.

Figure 2:
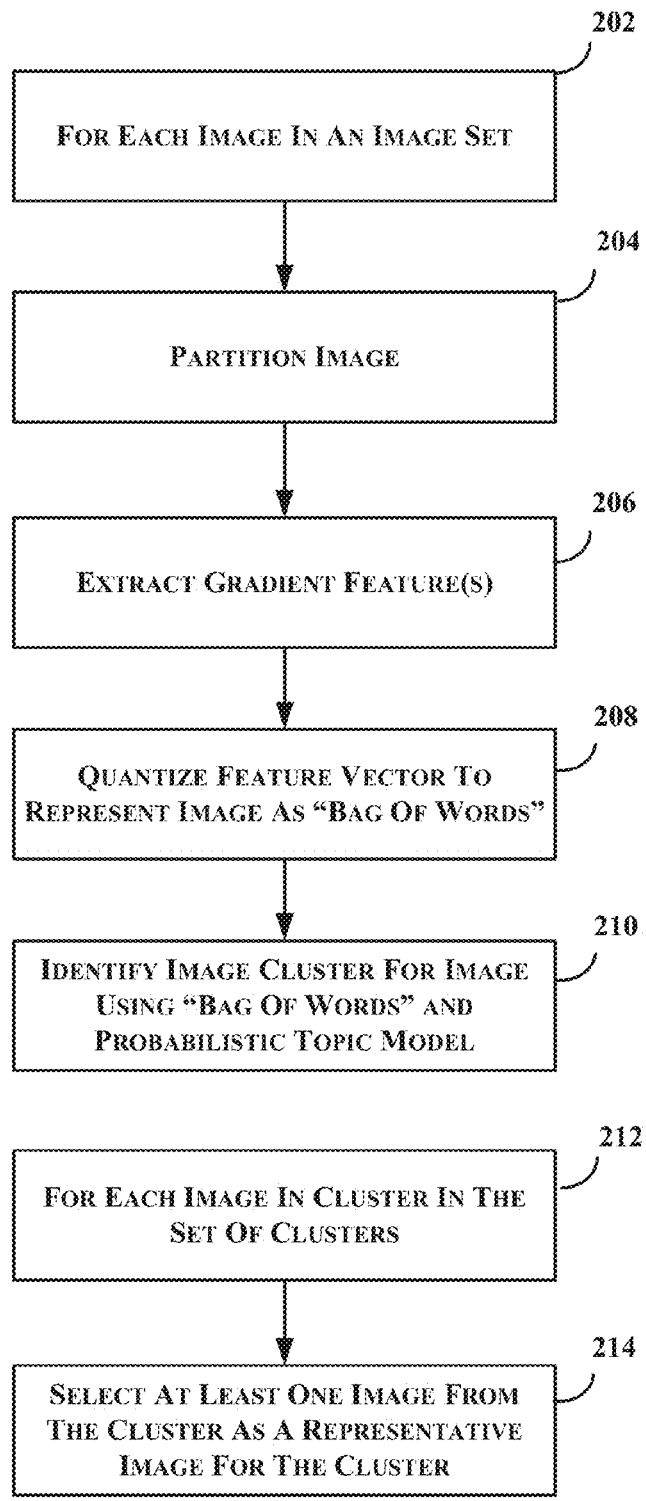

FIG. 2 provides an example of a process flow in accordance with one or more embodiments. As indicated in step 202, steps 204, 206, 208 and 210 are performed for each image that is to be assigned to an image cluster. As indicated in step 212, step 214 is performed for each image cluster. In accordance with one or more embodiments, the process flow of FIG. 2 is preferably performed by a number of computing systems, computing devices, etc. to implement a map-reduce architecture. By way of a non-limiting example, a computing system may operate in a mapper capacity while the same or another computing system may operate in a reducer capacity. By way of a further non-limiting example, each computing system may implement one or more of a mapper and/or a reducer. By way of a further non-limiting example, multiple computer systems may be used, each of which may operate as a mapper and/or a reducer. Of course, it should be apparent that the process flow of FIG. 2 may be performed by any computing architecture comprising one or more computing systems, computing devices, etc.

At step 204, each image, i, is partitioned, or divided, into a grid, e.g., a multidimensional grid, to form a plurality of partitions of the image. Each partition undergoes gradient feature extraction to generate a gradient feature for each image partition. By way of a non-limiting example, each gradient feature may comprise a set of floating point numbers. In accordance with one or more embodiments, each image has an associated collection of gradient features, and the collections across all of the images are used to build a vocabulary and each image's collection of gradient features is used to identify a "bag of words," or set of words, from the vocabulary to be associated with the image. In accordance with one or more embodiments, a feature vector generated for each partition of an image may be a visual signature that is used to build the vocabulary, e.g., the visual representations in the visual domain may be considered to correspond to words in a textual domain.

In accordance with one or more embodiments, at step 206, each partition of the image, i, is represented as a gradient feature vector, e.g., a Speeded Up Robust Features ("SURF") feature vector, comprising some number, 128 or 64, of floating point values. By way of a non-limiting example, each partition of image, i, may be divided into sub-partitions, e.g., each partition is divided into four sub-partitions, and a portion of the feature vector representing the image partition is generated from each sub-partition and local image gradients, dx and dy, which are calculated from the image data from the portion of the image corresponding to the sub-partition.

Thus, in accordance with one or more embodiments, each partition of an image, i, may be represented by a feature vector, e.g., a vector comprising a number of floating point values, and each image, i, may be represented in the aggregate by the set feature vectors generated from the image's partitions. In accordance with one or more embodiments, the set of feature vectors determined from the partitions of the image, i, may be quantized to generate a set of quantized features, $f_i$, each value corresponding to a "word" and collectively the values identify the set of words, or "bag of words," identified for the image, i. In accordance with one or more embodiments, since images may differ in size, the feature set, $f_i$, may be determined using features determined tier image partitions rather than from pixel-level features.

In accordance with one or more embodiments, the "bag of words" determined for each image may be used as input to a probabilistic model, e.g., a probabilistic topic model, to identify an image cluster to which the image belongs. In accordance with one or more embodiments, the model comprises a map-reduce based probabilistic topic model.

With reference to step 208, a "bag of words" is generated for each image using the image's feature vectors determined in step 206. By way of a non-limiting example, for a given image, each partition of the image has a SURF feature vector determined for the partition and the image's SURF feature vector set, which set may comprise a feature vector generated for each image partition, is quantized by k-means clustering to generate the image's quantized feature vector set, $f_i$, each quantized feature in an image's quantized feature set, $f_i$, may correspond to a word in a vocabulary of words. In accordance with one or more embodiments, the number of word clusters, k, corresponds to a number of "words" in a vocabulary, each cluster corresponding to a word, and each word corresponding to a scalar value determined using the feature vectors generated for the images. These clusters may be referred to herein as word clusters, or simply words. The k-means clustering may take as input the number of words to generate, k, and the set of feature vectors, $f_i$, for each image, and may in turn identify a set of scalars, each scalar may correspond to a "word" in the vocabulary of words used with the images. In accordance with one or more embodiments, each feature vector in an image's feature vector set, $f_i$, may be associated a particular word. By way of a non-limiting example, a feature vector may associated with a word if it is determined to be more closely aligned to that word than any of the other words in a vocabulary of words. By way of a further non-limiting example, each "word" is represented as a scalar value determined for the word using the k-means clustering, and the k-means clustering identifies a scalar value for each of the k words in the vocabulary. In accordance with one or more embodiments, using k-means clustering, each image's set of SURF features is represented as a set of quantized SURF features, $f_i$, e.g., each of the SURF features in the set is quantized by k-means clustering and taking into account the desired number of words in the vocabulary. By way of a non-limiting example, the vocabulary size might be 50,000; however, it should be apparent that another vocabulary size may be used in connection with embodiments of the present disclosure.

By virtue of steps 204, 206 and 208, each image is associated with a "bag of words" corresponding to the set of quantized feature vectors, $f_i$, determined using the set of feature vectors generated from the partitions of the image. By way of a non-limiting example, an image's "bag of words" comprises a set of words and each word belongs to the vocabulary of words determined by the k-means clustering. In accordance with one or more embodiments, the vocabulary size, or number of words, corresponds to the number of clusters used in the k-means clustering. By way of a further non-limiting example, each word associated with an image may be associated with a partition of the image and the feature vector generated from the partition of the image. By way of a further non-limiting example, each partition of the image may have an associated word, and the collection, or set, of words determined using an image's feature vectors is the image's "bag of words."

At step 210, each image is assigned to an image cluster, e.g., image cluster 104 or image cluster 108 using the image's "bag of words" and a probabilistic topic model. In accordance with one or more embodiments, there are a number of image clusters, C, each of which may be considered to correspond to a topic, and each image, i, is assigned to an image cluster using the image's "bag of words" as input to the probabilistic topic mode. In accordance with one or more embodiments, the probabilistic topic model is a map-reduce based probabilistic topic model. In accordance with one or more embodiments, a cluster-membership probability distribution is determined for each image, i, the cluster-membership probability distribution indicating a probability for each image cluster, c, that image, i, belongs to that cluster; and image, i, may be assigned to an image cluster, c, that has a corresponding high probability in the image's cluster-membership probability distribution relative to the other cluster-membership probabilities indicated in the image's cluster-membership probability distribution.

Figure 3:
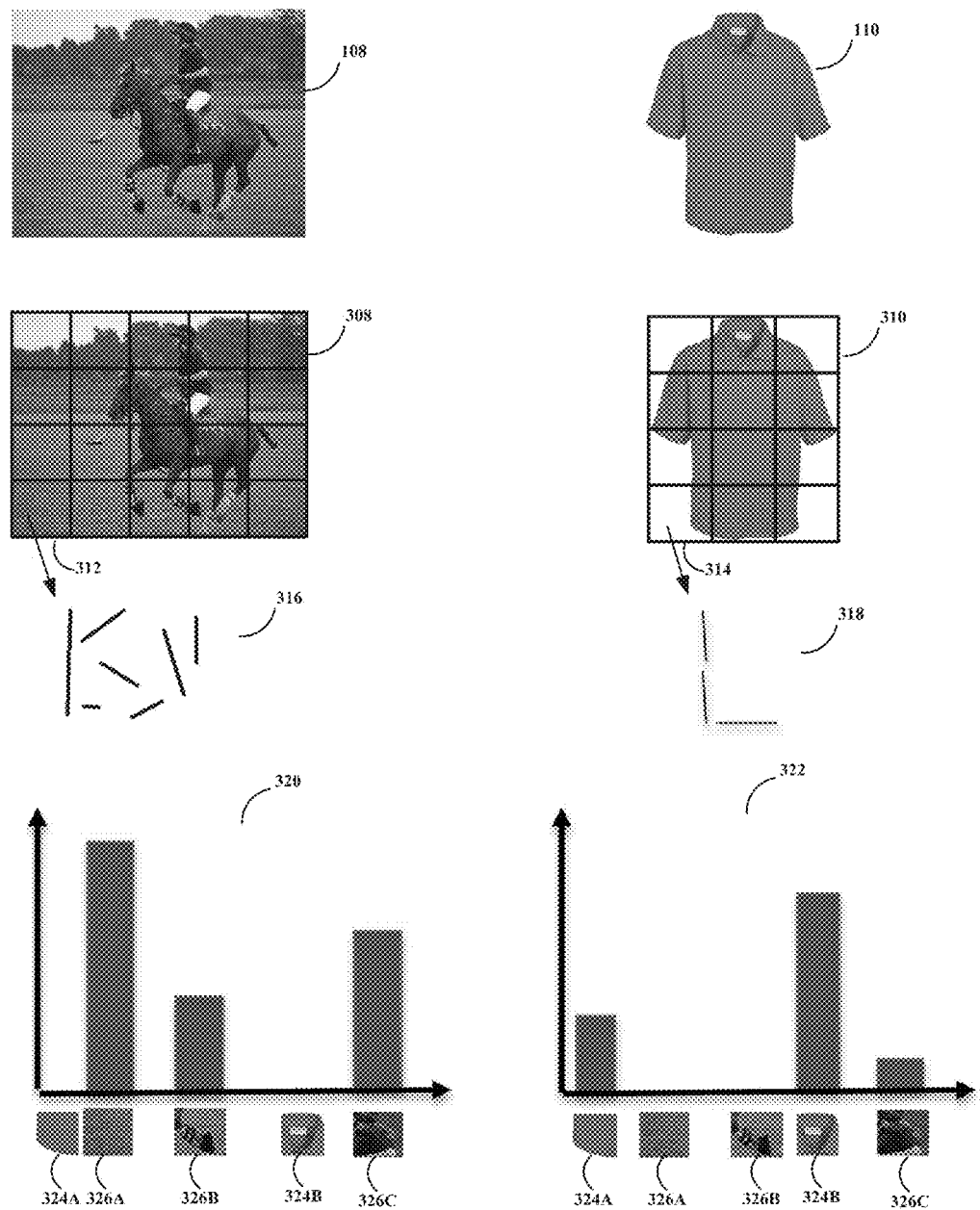

FIG. 3 provides an example of image processing in accordance with FIG. 2 and one or more embodiments of the present disclosure. In the example, image 108 depicts a scene from a polo event and image 110 depicts a polo T-shirt. In accordance with step 204 of FIG. 2, each of images 108 and 110 is partitioned, e.g., a partitioned image 308 is shown of image 108 being divided into 20 partitions using a 4×5 grid and a partitioned image 310 is shown of image 110 being divided into 12 partitions using a 4×3 grid. Image gradients, or gradient-related features, are generated using image data from the partitions of image 108 and image gradients 314 are generated using image data from partitions of image 110. In the example, image gradients 316 are generated from image data of partition 312 of image 108 and image gradients 318 are generated from image data of partition 314 of image 110.

Histograms 320 and 322 illustrate some of the words from a vocabulary of words as positions along the x-axis and a frequency along the y-axis. Histogram 320 provides an example of word frequencies that might correspond with an image of a polo event, such as image 108, and histogram 322 reflects word frequencies that might correspond to an image of a polo T-shirt, such as image 110. In the example, each position along the x-axis corresponds to a scalar value of a "word" to which an image partition is associated. In accordance with one or more embodiments, each scalar value corresponds to a word in the vocabulary of words, and the scalar value(s) and vocabulary may be determined using k-means clustering and the feature vectors generated from image partitions as discussed herein.

In accordance with one or more embodiments, vector quantization for a given image, i, uses each partition's feature vector to identify the "words" found in the image as well as the number of occurrences of each word found in the image. A histogram similar to that shown in FIG. 3 may be constructed for each image, i, which identifies each word and a count of occurrences, or a frequency of each word, found for the image. In accordance with one or more embodiments, word order is ignored, e.g., the location of a partition in an image, which partition has a corresponding word, may be ignored. Each image, i, may have a corresponding unordered set of words, or "bag of words," comprising the words found for the image and the number of occurrences of each word found for the image.

Thus, in the example shown in FIG. 3, the scalar values associated with words in the vocabulary of words are shown along the x-axis of each of histograms 320 and 322 and the y-axis represents a frequency, e.g., the number of occurrences of each word found in images. In the example, positions, or scalars, 326 correspond to words more likely to be found in an image of a polo event, e.g., grass corresponding to scalar position 326A, a horse's leg and hoof corresponding to scalar position 326B, a player corresponding to scalar position 326C; while positions 324 are more likely to be found in an image of a polo T-shirt, e.g., a lower left portion of a polo T-shirt corresponding to scalar position 324A and a color portion of a polo T-shirt corresponding to scalar position 324B. In the example, the higher frequencies shown in histogram 320 are associated with scalar values, or words, associated with a polo event, e.g., position 326A, which corresponds to a scalar value, or word, generated from image partitions depicting grass. Conversely, the higher frequencies shown in histogram 322 are associated with scalar values, or words associated with a polo T-shirt, e.g., position 324B, which corresponds to a scalar value, or word, generated from image partitions depicting a polo T-shirt collar. From the frequencies shown in histograms 320 and 322, the set of words and/or frequencies of words associated with images of a polo event is/are likely to differ from the set of words and word frequencies associated with images of a polo T-shirt. As illustrated in the example histograms 320 and 322, word 326C may occur with both images 108 and 110; however, the frequency of occurrence of word 326C differs. As might be expected, an image partition partially depicting a person wearing a polo T-shirt may result in some gradient-related features that have correspondence with gradient-related features generated from an image partition that partially depicts a polo T-shirt. In accordance with one or more embodiments, the words as well as the frequencies of words associated with each of the images may be used in accordance with one or more embodiments to assign images to image clusters.

As discussed with reference to FIG. 2, each image is assigned to an image cluster at step 210. In accordance with one or more embodiments, step 210 may comprises a generative process and may use a Latent Dirichlet Allocation (LDA) framework, or a variation of LDA. In accordance with one or more embodiments, each image, i, is represented by a set of feature vectors, $f_i$, where i has a value greater than zero and less than or equal to I, e.g., $0 < i \leq I$. The generative process used in accordance with at least one embodiment determines or draws, a topic distribution, for each topic, or image cluster, c, in an image cluster set C, over the vocabulary, e.g., the vocabulary determined, or built, using the process shown in FIG. 2, and each topic distribution corresponds to a given topic, c, of the topic set, C. In accordance with one or more embodiments, each topic corresponds to an image cluster. This may be expressed as follows:

1. For c=1, . . . , C.

$$\text{(a) Draw } \Phi_c \sim \text{Dirichlet}(\beta), \quad \text{Expr.(1)}$$

In accordance with one or more embodiments, the generative process further comprises generating for each image, i, in the set of images, I, a distribution, which is determined, or drawn, over the set of topics, C, the distribution, which is also referred to herein as a cluster-membership probability distribution, comprises a probability for each image cluster, c, in image cluster set, C, that the image, i, belongs to the image cluster, e.g., the probability for a given cluster, c, may be thought of as a measure of the relatedness of the image cluster, c, to the image, i, or vice versa. In accordance with one or more embodiments, image, i, may be assigned, to the image cluster, c, having the highest associated probability in the cluster-membership probability distribution generated for image, i. This step in the generative process may be expressed as follows:

2. For i=1, . . . , I, $$\text{(a) Draw } \Theta_i \sim \text{Dirichlet}(\alpha), \quad \text{Expr.(2)}$$

$$\text{(b) Draw } f_i \sim \text{Multinomial}(\Sigma_c^C \Phi_c \theta_{ic}), \quad \text{Expr.(3)}$$

With respect to expressions (1)-(3), Dirichlet($\alpha$) and Dirichlet($\beta$) denote a Dirichlet distribution parameterized by $\alpha$ and $\beta$, respectively; $\Phi_c$, denotes a cluster-specific parameter, or probability distribution, for the $c^{th}$ image cluster, which probability distribution is drawn over a set of visual word vectors corresponding the images in the set of images, I; $\Theta_i$ is the image-specific parameter, which represents the image-cluster membership probability distribution, which may be expressed as a vector, for the $i^{th}$ image, which cluster-membership probability distribution may be expressed as $\Theta_i = \{\theta_{i1}, \theta_{i2}, \ldots, \theta_{iC}\}$, with $\theta_{ic}$ denoting the probability that the $i^{th}$ image belongs to the $c^{th}$ cluster, and $0 < c \leq C$. The muitinomial in expression (3) may be a standard multinomial distribution used in LDA.

In accordance with one or more embodiments, cluster-specific parameters comprise a cluster-specific model parameter, $\Phi_c$, for each cluster, c, where the cluster's cluster-specific parameter, $\Phi_c$, comprises a probability distribution drawn over a set of visual word vectors, each visual word vector corresponding to an image, i, from the set of images, I. The set of visual word vectors determined using the quantized gradient-related feature vectors determined for images from the set of images, I. The probability distribution for cluster, c, comprises a probability for each visual word vector of the set of visual word vectors, each probability indicating a probability that a corresponding visual word vector is related to the cluster, c.

In accordance with one or more embodiments, image-specific parameters for an image, i, comprise a probability distribution over a set of clusters, C, the image's probability distribution comprising a cluster membership probability for each cluster in the set of clusters, each cluster membership probability indicating a probability that the image, i, belongs to the cluster, c.

In accordance with one or more embodiments, $f_i$, which is the feature vector set for the $i^{th}$ image may be observed, and the following may be inferred: (i) probability vector, $\Theta_i$, for the $i^{th}$ image, which characterizes the $i^{th}$ image's membership to each image cluster, c, in cluster set, C; and (ii) model parameter $\Phi_c$, which summarizes the characteristics of the $c^{th}$ image cluster.

With reference to step 214 of FIG. 2, each image cluster may be represented, e.g., in a display of clusters, using one or more images belonging to the cluster. By way of some non-limiting examples, a representative image may be selected using the image's cluster membership value relative to other the membership values of other images belonging to the cluster. By way of a further non-limiting example, each image belonging to an image cluster has a cluster-membership probability distribution, $\Phi_i$, which characterizes the image's probability of membership in each of the C image clusters, and assuming that image, i, is assigned to cluster, c, the probability that image i, is a member of image cluster, c, is represented as, $\theta_{ic}$. Thus, for a given cluster, c, each image, i, assigned to the cluster has a probability, or membership value, and the probabilities, or membership, values associated with the images assigned to the cluster may be used to rank the images and/or select one or more images, e.g., select one or more images that have an associated high membership probability relative to other images, e.g., other images that are also members of the cluster. It should be apparent that any other method of selecting a representative image may also be used with embodiments of the present disclosure. By way of a non-limiting example, a similarity measure may be generated tier images belonging to a cluster, which similarity measure for a given image, i, may indicate how similar the image is to other images in the cluster; the similarity measures of images belonging to the cluster may be used to select the representative image(s) for the cluster.

At least one embodiment of the present disclosure may provide large scale image modeling capable of modeling millions of images; and may address storage and learning problems associated with such large scale image modeling. In accordance with one or more such embodiments, a map-reduce architecture may be used. To provide large scale image modeling, it is necessary to be able to store large volumes of images and their associated features. Additionally, a sufficient amount of processing capacity is needed for learning the large number of parameters associated with modeling millions of images, e.g., $\Theta_i$ may scale linearly with the number of images I.

Figure 4:
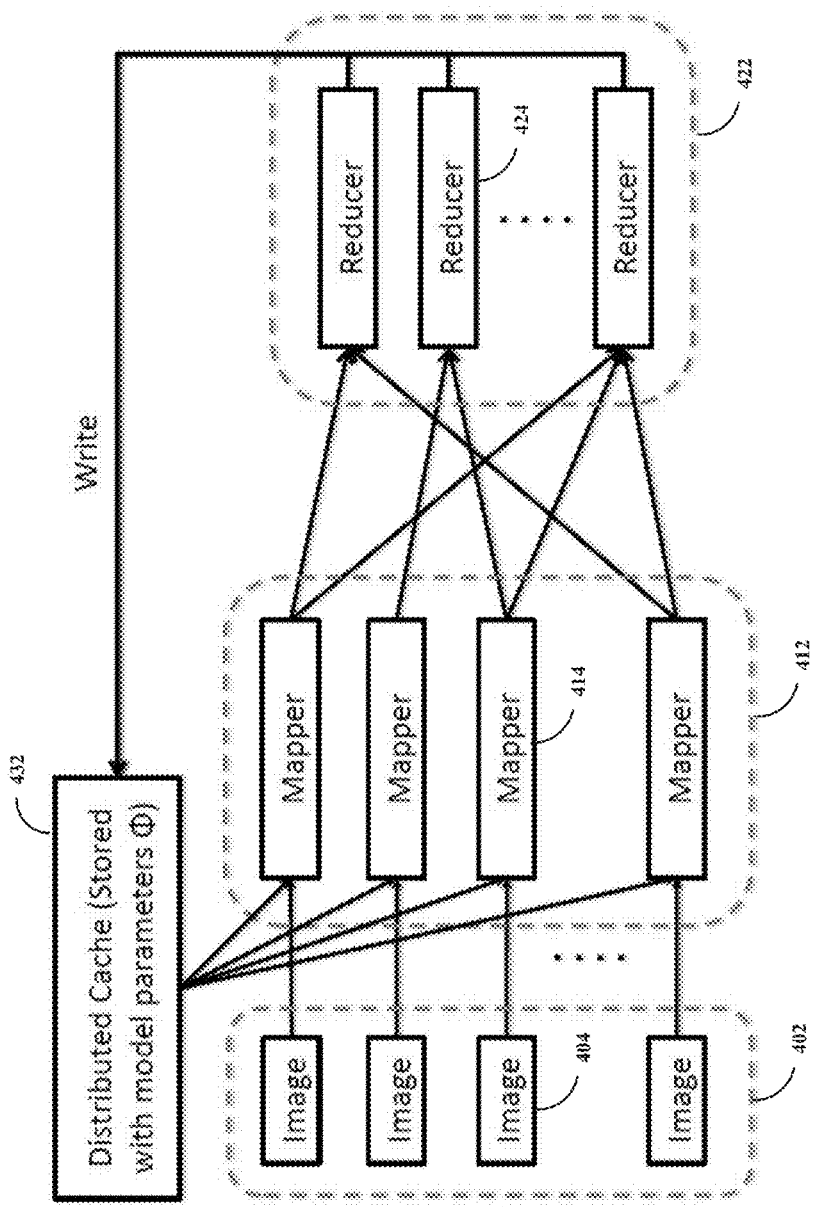

Embodiments of the present disclosure make use of a distributed file system, e.g., Hadoop Distributed File System (HDFS), to store the data, e.g., image and model data, and a distributed computing framework for model learning. FIG. 4 provides an overview of a framework tier image storage and image clustering using a learned model in accordance with one or more embodiments of the present disclosure.

A model implemented in accordance with one or more embodiments may handle multiple millions of images in parallel using the MapReduce computing paradigm. With reference to FIG. 2, step 210 may comprise model generation and update and image cluster assignment. In such a scenario, mappers might be used to perform the image cluster assignment and reducers might be used to generate and update the model. By way of some further non-limiting illustration, the data, e.g., the images and each image's set of feature vectors, $f_i$, where $0 < i \leq I$, may be stored in a distributed file system 402, e.g., an MRS. Mappers 412 may be used to learn image-specific parameters, e.g., $\Theta_i$, for each image i, where $0 < i \leq I$, using the data stored in the distributed file system 402. Image cluster parameters, e.g., $\Phi_c$, where $0 < c \leq C$, may be learned using reducers 422 using data supplied to the reducers 422 from the mappers 412. By way of some non-limiting examples, the data supplied to the reducers 422 may comprise any of the data available to the mappers 412, such as and without limitation, for a given image, the original image data, the image's set of feature vectors, $f_i$, the image's cluster-membership probability vector, etc. In accordance with one or more embodiments, the mappers and reducers may perform their operations in parallel, e.g., a mapper performs its processing and learns image-specific parameters as a reducer performs its processing and learns image cluster parameters.

As further illustration and without limitation, a mapper 414 of mappers 412 may retrieve model parameters $\Phi$ from distributed cache 432 and read data for an image from a distributed storage instance 404 of distributed storage 402, and calculate an image-cluster membership probability vector, $\Theta_i$, for the image using the retrieved model parameters, $\Phi$. In accordance with one or more embodiments, the image data may include the image's set of feature vectors, $f_i$, which may have been previously determined using steps 204, 206 and 208 of FIG. 2, for example. Alternatively, mapper 414 may generate the image's set of feature vectors, $f_i$, in accordance with steps 204, 206 and 208 of FIG. 2, for example; in this case, mapper 414 may store the image's set of feature vectors, $f_i$, in distributed file storage 402. Mappers 412 may output calculated image-cluster-membership probability vectors to one or more reducers 422. By way of a non-limiting example, mapper 414 may supply data to reducer 424 of reducers 422, and reducer 424 may generate updated model parameters $\Phi$ using the image-cluster membership probability vector output provided by one or more of mappers 422, and store the updated model parameters in distributed cache 432 for access by mappers 412. In accordance with one or more embodiments, mappers 412, including mapper 414, may operate in parallel with reducers 422, including reducer 424.

Image clustering provided in accordance with one or more embodiments may be used in various applications, including without limitation image retrieval and search. By way of some non-limiting examples, image clusters may be used in a drill-down approach, such that a number of clusters are presented by displaying, e.g., on one or more web pages, one or more representative images belonging to each image cluster. Each image cluster may be selectable by selecting the one or more representative images; and in response some or all of the images belonging to the selected image cluster may be displayed. As yet another non-limiting example, some number of images from a given image cluster may be presented in response to a user request for images using an image or images as a query. By way of a non-limiting example, an image, or images, identified by the user may be used to retrieve images from an image cluster, or image clusters. By way of a further non-limiting example, "words" associated with one or more images might be used as query terms to identify one or more image clusters, and/or one or more images, for a search result set.

Figure 5:
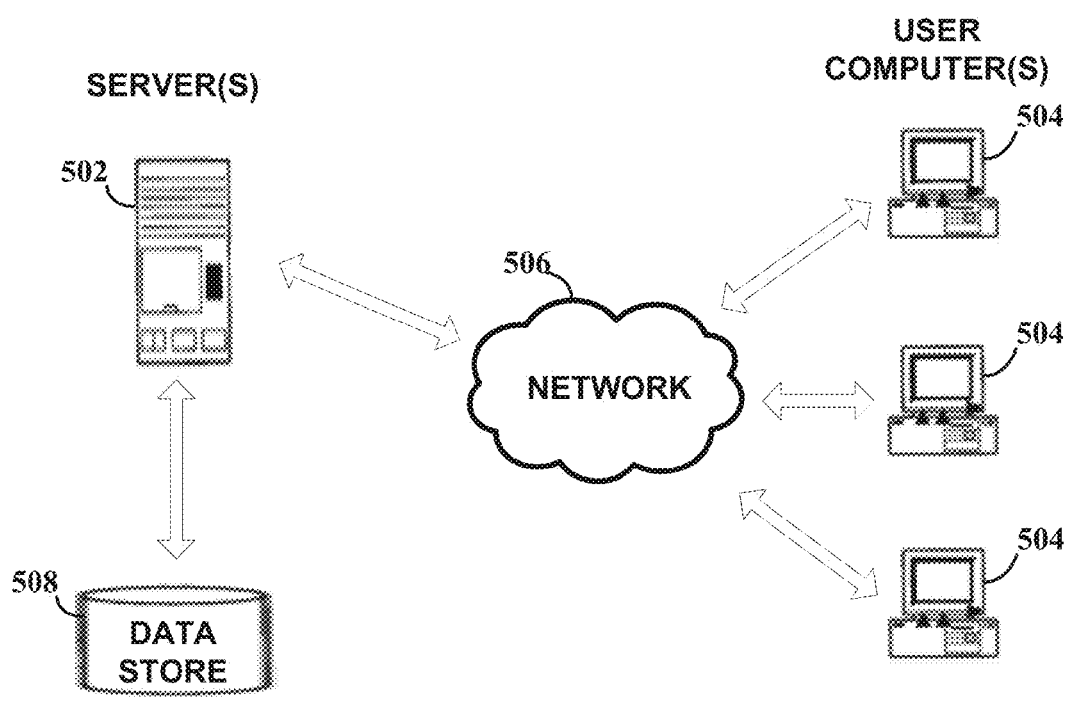
FIG. 5 illustrates some components that can be used in connection with one or more embodiments of the present disclosure.

FIG. 5 illustrates some components that can be used in connection with one or more embodiments of the present disclosure. The illustrative components might be part of a client-server architecture that services user image search and retrieval requests, for example. In accordance with one or more embodiments of the present disclosure, one or more computing devices, e.g., one or more servers, user devices or other computing device, are configured to comprise functionality described herein. For example, a computing device 502 can be configured to execute program code, instructions, etc. to provide functionality in accordance with one or more embodiments of the present disclosure.

Computing device 502 can serve content to user computing devices 504 using a browser application via a network 506. Data store 508 might be used to store program code to configure a server 502 to execute a search engine 102, etc.

The user computing device 504 may be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 502 and the user computing device 504 can include one or more processors, memory, a removable media reader, network interface, display and interface, and one or more input devices, e.g., keyboard, keypad, mouse, etc., and input device interface, for example. One skilled in the art will recognize that server 502 and user computing device 504 may be configured in many different ways and implemented using many different combinations of hardware, software, or firmware.

In accordance with one or more embodiments, a computing device 502 can make a user interface available to a user computing device 504 via the network 506. The user interface made available to the user computing device 504 can include content items, or identifiers (e.g., URLs) selected for the user interface in accordance with one or more embodiments of the present invention. In accordance with one or more embodiments, computing device 502 makes a user interface available to a user computing device 504 by communicating a definition of the user interface to the user computing device 504 via the network 506. The user interface definition can be specified using any of a number of languages, including without limitation a markup language such as Hypertext Markup Language, scripts, applets and the like. The user interface definition can be processed by an application executing on the user computing device 504, such as a browser application, to output the user interface on a display coupled, e.g., a display directly or indirectly connected, to the user computing device 504.

In an embodiment the network 506 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 5. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 6:
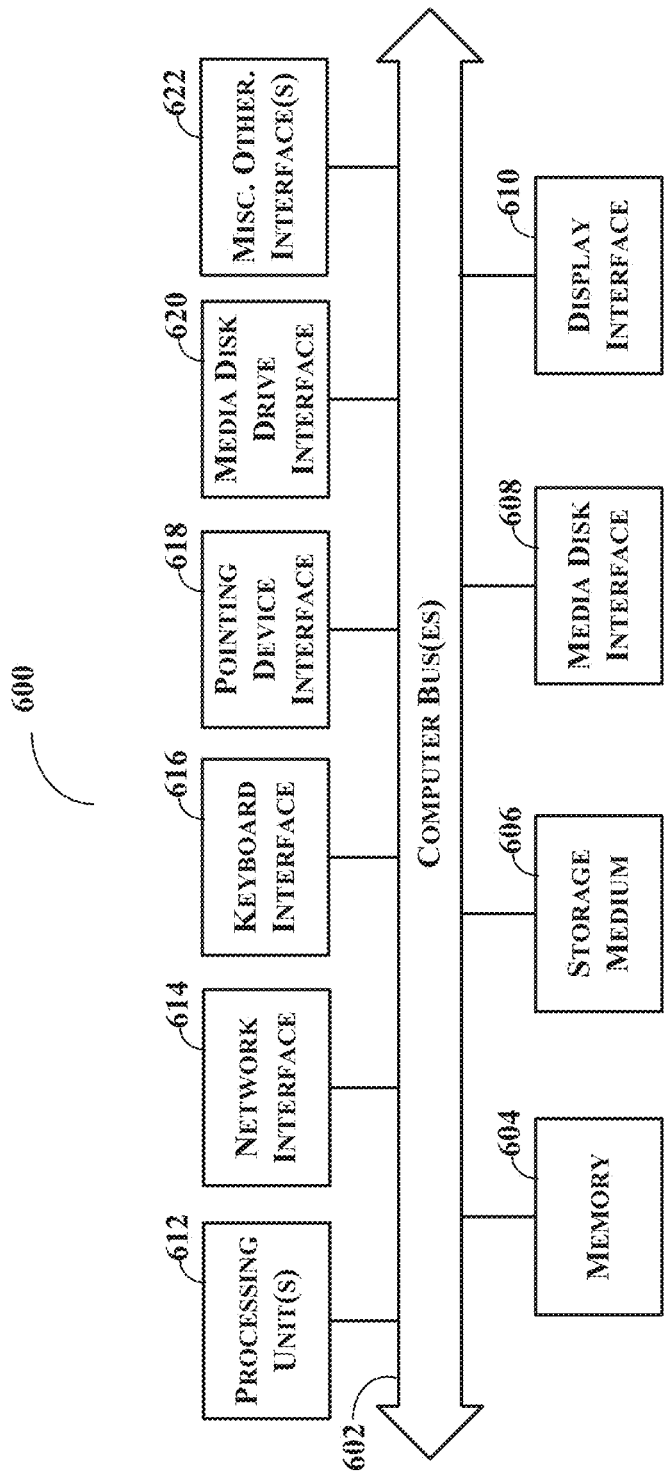
FIG. 6 is a detailed block diagram illustrating an internal architecture of a computing device in accordance with one or more embodiments of the present disclosure.

FIG. 6 is a detailed block diagram illustrating an internal architecture of a computing device, e.g., a computing device such as server 502 or user computing device 504, in accordance with one or more embodiments of the present disclosure. As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), etc., media disk drive interface 620 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, computer-readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure, a computer-readable medium stores computer data, which may include computer-executable program code executable by a computer, in a machine-readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
representing, by at least one computing device, each of a plurality of images as a plurality of quantized gradient-related feature vectors;
building, by the at least one computing device, a vocabulary of words using each image's plurality of quantized gradient-related feature vectors;
generating, by the at least one computing device and using the vocabulary, a probabilistic topic model comprising image-specific parameters for each image in the plurality of images and cluster-specific parameters for each of a plurality of clusters, the image-specific parameters and cluster-specific parameters being learned in parallel using a map-reduce architecture;

assigning, by the at least one computing device, each image from the plurality of images to a cluster from the plurality of clusters using the image's image-specific parameters and the probabilistic topic model, each cluster corresponding to a word in the vocabulary; and identifying, by the at least one computing device and for each cluster from the plurality of clusters, at least one image assigned to the cluster as a representative image for the cluster.

2. The method of claim 1, the method further comprising:
the at least one computing device comprising a number of first computing devices as mappers in the map-reduce architecture and a number of second computing devices as reducers in the map-reduce architecture, the mappers and the reducers operating in parallel;

learning the image-specific parameters for each image in the plurality of images processed by a first computing device as a mapper in the map-reduce architecture; and learning the cluster-specific parameters for each cluster in the plurality of clusters processed by a second computing device as a reducer in the map-reduce architecture.

3. The method of claim 2, a first computing device from the number of first computing devices being further configured for use as a reducer and a second computing device from the number of second computing devices being further configured for use as a mapper.

4. The method of claim 2, the method further comprising:
each mapper learning an image's image-specific parameters by performing operations comprising:
retrieving data associated with the image from a distributed file system;
retrieving the cluster-specific parameters from a distributed cache; and
learning the image's image-specific parameters using the image's retrieved data and the retrieved cluster-specific parameters;

each reducer learning the cluster-specific parameters by performing operations comprising:
receiving data from at least one mapper, the data received from each mapper comprising the image's image-specific parameters learned by the mapper;
retrieving the cluster-specific parameters from the distributed cache; and
making any updates to the cluster-specific parameters learned using the received image-specific parameters and the retrieved cluster-specific parameters.

5. The method of claim 1, the image-specific parameters for an image comprising a probability distribution over the plurality of clusters, the probability distribution comprising a cluster membership probability for each cluster of the plurality of clusters, each cluster membership probability indicating a probability that the image belongs to the cluster.

6. The method of claim 1, the cluster-specific parameters comprising a probability distribution for each cluster over a plurality of visual word vectors, each visual word vector corresponding to an image of the plurality of images, a plurality of visual word vectors determined using the plurality of quantized gradient-related feature vectors determined for images from the plurality of images, the probability distribution for a cluster comprising a probability for each visual word vector of the plurality of visual word vectors, each probability indicating a probability that the visual word vector is related to the cluster.

7. The method of claim 1, the representing each of a plurality of images as a plurality of quantized gradient-related feature vectors further comprising:
partitioning an image into a plurality of partitions;
extracting gradient feature vectors from each partition of the plurality of partitions; and
quantizing the gradient feature vectors using k-means clustering, where k corresponds to a number of words in the vocabulary of words, and each of the quantized gradient feature vectors corresponds to a word in the vocabulary of words.

8. A system comprising:
at least one computing device, each computing device comprising a processor and a storage medium for tangibly storing thereon program logic for execution by the processor, the stored program logic comprising:
representing logic executed by the processor for representing each of a plurality of images as a plurality of quantized gradient-related feature vectors;
building logic executed by the processor for building a vocabulary of words using each image's plurality of quantized gradient-related feature vectors;
generating logic executed by the processor for generating, using the vocabulary, a probabilistic topic model comprising image-specific parameters for each image in the plurality of images and cluster-specific parameters for each of a plurality of clusters, the image-specific parameters and cluster-specific parameters being learned in parallel using a map-reduce architecture;
assigning logic executed by the processor for assigning each image from the plurality of images to a cluster from the plurality of clusters using the image's image-specific parameters and the probabilistic topic model, each cluster corresponding to a word in the vocabulary; and
identifying logic executed by the processor for identifying, for each cluster from the plurality of clusters, at least one image assigned to the cluster as a representative image for the cluster.

9. The system of claim 8:
the at least one computing device comprising a number of first computing devices as mappers in the map-reduce architecture and a number of second computing devices as reducers in the map-reduce architecture, the mappers and the reducers operating in parallel;

each first computing device's storage medium tangibly storing thereon program logic for execution by the processor, the stored program code comprising learning logic executed by the processor for learning the image-specific parameters for each image in the plurality of images processed by the first computing device as a mapper in the map-reduce architecture; and each second computing device's storage medium tangibly storing thereon program logic for execution by the processor, the stored program code comprising learning logic executed by the processor for learning the cluster-specific parameters for each cluster in the plurality of clusters processed by the second computing device as a reducer in the map-reduce architecture.

10. The system of claim 9, a first computing device from the number of first computing devices being further configured for use as a reducer and a second computing device from the number of second computing devices being configured for use as a mapper.

11. The system of claim 9, the stored program logic further comprising:
for each mapper, the learning logic executed by the processor for learning an image's image-specific parameters further comprising:

retrieving logic executed by the processor for retrieving data associated with the image from a distributed file system;

retrieving logic executed by the processor for retrieving the cluster-specific parameters from a distributed cache; and learning logic executed by the processor for learning the image's image-specific parameters using the image's retrieved data and the retrieved cluster-specific parameters;

for each reducer, learning logic executed by the processor for learning the cluster-specific parameters further comprising:

receiving logic executed by the processor for receiving data from at least one mapper, the data received from each mapper comprising the image's image-specific parameters learned by the mapper;

retrieving logic executed by the processor for retrieving the cluster-specific parameters from the distributed cache; and making logic executed by the processor for making any updates to the cluster-specific parameters learned using the received image-specific parameters and the retrieved cluster-specific parameters.

12. The system of claim 8, the image-specific parameters for an image comprising a probability distribution over the plurality of clusters, the probability distribution comprising a cluster membership probability for each cluster of the plurality of clusters, each cluster membership probability indicating a probability that the image belongs to the cluster.

13. The system of claim 8, the cluster-specific parameters comprising a probability distribution for each cluster over a plurality of visual word vectors, each visual word vector corresponding to an image of the plurality of images, a plurality of visual word vectors determined using the plurality of quantized gradient-related feature vectors determined for images from the plurality of images, the probability distribution for a cluster comprising a probability for each visual word vector of the plurality of visual word vectors, each probability indicating a probability that the visual word vector is related to the cluster.

14. The system of claim 8, the representing logic executed by the processor for representing each of a plurality of images as a plurality of quantized gradient-related feature vectors further comprising:

partitioning logic executed by the processor for partitioning an image into a plurality of partitions;

extracting logic executed by the processor for extracting gradient feature vectors from each partition of the plurality of partitions; and quantizing logic executed by the processor for quantizing the gradient feature vectors using k-means clustering, where k corresponds to a number of words in the vocabulary of words, and each of the quantized gradient feature vectors corresponds to a word in the vocabulary of words.

15. A computer readable non-transitory storage medium for tangibly storing thereon computer readable instructions that when executed cause at least one processor to:

represent each of a plurality of images as a plurality of quantized gradient-related feature vectors;

build a vocabulary of words using each image's plurality of quantized gradient-related feature vectors;

generate, using the vocabulary, a probabilistic topic model comprising image-specific parameters for each image in the plurality of images and cluster-specific parameters for each of a plurality of clusters, the image-specific parameters and cluster-specific parameters being learned in parallel using a map-reduce architecture;

assign each image from the plurality of images to a cluster from the plurality of clusters using the image's image-specific parameters and the probabilistic topic model, each cluster corresponding to a word in the vocabulary; and identify, for each cluster from the plurality of clusters, at least one image assigned to the cluster as a representative image for the cluster.

16. The medium of claim 15:

the at least one processor comprising a number of first processors as mappers in a map-reduce architecture and a number of second processors as reducers in the map-reduce architecture, the mappers and reducers operating in parallel, the instructions further comprising instructions to;

learn the image-specific parameters for each image in the plurality of images processed by a first processor as a mapper in the map-reduce architecture; and learn the cluster-specific parameters for each cluster in the plurality of clusters processed by a second processor as a reducer in the map-reduce architecture.

17. The medium of claim 16, a first processor from the number of first processors being further configured for use as a reducers and a second processor from the number of second processors being further configured for use as a mapper.

18. The medium of claim 16, the instructions further comprising instructions:

for each mapper, the instructions to learn an image's image-specific parameters comprising instructions to:

retrieve data associated with the image from a distributed file system;

retrieve the cluster-specific parameters from a distributed cache; and learn the image's image-specific parameters using the image's retrieved data and the retrieved cluster-specific parameters;

for each reducer, the instructions to learn the cluster-specific parameters comprising instructions to:

receive data from at least one mapper, the data received from each mapper comprising the image's image-specific parameters learned by the mapper;

retrieve the cluster-specific parameters from the distributed cache; and make any updates to the cluster-specific parameters learned using the received image-specific parameters and the retrieved cluster-specific parameters.

19. The medium of claim 15, the image-specific parameters for an image comprising a probability distribution over the plurality of clusters, the probability distribution comprising a cluster membership probability for each cluster of the plurality of clusters, each cluster membership probability indicating a probability that the image belongs to the cluster.

20. The medium of claim 15, the cluster-specific parameters comprising a probability distribution for each cluster over a plurality of visual word vectors, each visual word vector corresponding to an image of the plurality of images, a plurality of visual word vectors determined using the plurality of quantized gradient-related feature vectors determined for images from the plurality of images, the probability distribution for a cluster comprising a probability for each visual word vector of the plurality of visual word vectors, each probability indicating a probability that the visual word vector is related to the cluster.

21. The medium of claim 15, the instructions to represent each of a plurality of images as a plurality of quantized gradient-related feature vectors further comprising instructions to:
- partition an image into a plurality of partitions;
- extract gradient feature vectors from each partition of the plurality of partitions; and
- quantize the gradient feature vectors using k-means clustering, where k corresponds to a number of words in the vocabulary of words, and each of the quantized gradient feature vectors corresponds to a word in the vocabulary of words.

* * * * *